April 8, 1958  J. WEY  2,829,862
GATE VALVE
Filed April 14, 1954

INVENTOR
Joseph Wey
BY Fred C. Matheny
ATTORNEY

United States Patent Office 2,829,862
Patented Apr. 8, 1958

2,829,862
GATE VALVE
Joseph Wey, Zug, Switzerland
Application April 14, 1954, Serial No. 423,166
7 Claims. (Cl. 251—328)

This invention relates to a gate valve comprising a gate plate movable in a valve body in directions at right angles to a flow passageway through the valve body.

In ordinary gate valves the lower end portion of the gate plate seats within a groove in the metal valve body and makes metal to metal contact with the valve body. Also a gland is usually provided in the valve body as a sealing means around the valve stem or spindle. In these ordinary gate valves it is not always possible, particularly where the valves are subjected to high pressures, to maintain an efficient and perfect seal between the metallic gate plate and the metallic surface against which it seats. Also the groove or recess in an ordinary gate valve which forms the seat for the lower end of the gate plate provides a pocket and when the valve is open the flowing medium, if it is of a viscous nature, can collect in this pocket and interfere with the closing of the valve and even render the valve completely inoperative.

An object of my invention is to overcome the disadvantages above pointed out by providing a gate valve having a U-shaped sealing member of elastic material positioned in the plane of the gate plate and against which the edges and the lower end of the gate plate seat when the valve is closed, the U-shaped sealing member being disposed in a groove in the inner wall of the valve body and substantially filling the groove and being substantially flush with the surface of the flow passageway through the valve so that no depressions or traps are left in the walls of the flow passageway.

A further object is to provide a second sealing member of elastic material disposed within a groove in the valve body or housing and contacting the gate plate and extending across at least one side of the gate plate above the flow opening in the housing and joined with the U-shaped sealing member in such a manner as to completely surround the flow passageway through the valve, thus completely sealing off the gate plate around the flow passageway and doing away with the need for a packing gland around the valve stem or spindle.

Other objects of this invention are to provide a gate valve of simple, inexpensive and efficient construction in which the valve housing is formed of several different pieces separable in the plane of the gate plate.

Typical examples of my invention are illustrated in the accompanying drawings in which.

Like reference numerals indicate like parts throughout the several views.

Figure 1:
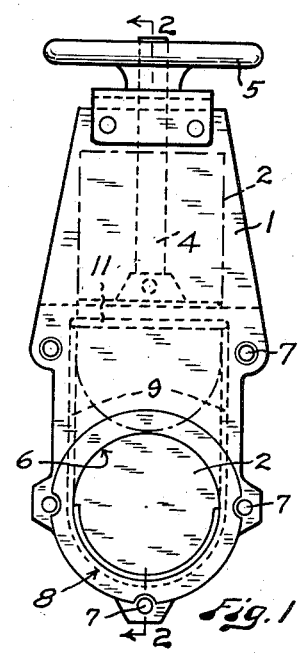
Figure 1 is an elevation of a gate valve constructed in accordance with my invention.
Figure 2:
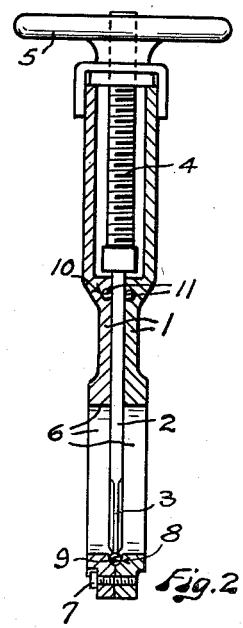
Fig. 2 is a view partly in vertical section and partly in elevation of the same taken substantially on broken line 2—2 of Fig. 1.

The gate valve shown in Figs. 1 and 2 comprises a valve body formed of two similar body members or plates 1 secured together face-to-face by screws 7 and having similar depressions in their inner faces, said depressions cooperating to form a gate plate receiving recess in which a gate plate 2 is slidably disposed. The gate plate 2 has a convexly rounded lower end. The upper end of the gate plate 2 is loosely connected with an operating spindle or stem 4 by which the gate plate can be moved slidably within the valve body 1 to open and close a flow passageway formed by openings 6 in the body plates 1. A handwheel 5 is provided on the upper end of the valve spindle 4.

The inner faces of the body plates 1 are provided, along the edges of the gate plate receiving recess in which the gate plate 2 operates, with mating grooves 8 which together cooperate to form a U-shaped groove or pocket conforming to the marginal outline of the gate plate 2. The pocket formed by the U-shaped grooves 8 is located in the medial plane of the gate plate and has a U-shaped sealing member 9 of elastic material such as rubber disposed therein. The sealing member 9 substantially fills the pocket formed by the grooves 8 and is approximately flush with the wall of the flow passageway formed by the openings 6 in the body members 1. This sealing member 9 is suitably positioned for sealing engagement with the lateral edges and rounded bottom end of the gate plate 2. Preferably the rounded bottom end portion of the gate plate 2 is beveled to provide a fairly thin edge 3 for contact with the sealing member 9.

In the inner walls of the valve body above the openings 6 in the body plates 1 is a ring groove 10 in which is disposed an elastic sealing ring 11. The elastic sealing ring 11 is approximately flush with the inner surfaces of the body members 1 and makes sealing contact with the gate plate 2. The groove 10 is in a plane at right angles to the gate plate 2 and the groove 8 intersects the groove 10.

The ends of the sealing member 9 join the sealing ring 11 in such a manner that the two members 9 and 11 extend entirely around the flow passageway through the valve. These sealing members 9 and 11 thus provide a marginal seal between the edges of the gate plate 2 and the body plates 1. They also provide a seal between the adjoining surfaces of the two body plates 1 preventing leakage between these plates 1 to the outside and they provide a seal entirely around the gate plate near the end thereof which connects with the spindle 4 and thus eliminate the need for a packing gland around the spindle 4. This effectively seals the flow passageway of the valve against leakage at the location of the gate plate. The inner surface of the sealing member 9 against which the edge 3 of the gate plate 2 seats is substantially flush with the walls 6 of the flow passageway through the valve and thus recessed valve seats and similar material collecting pockets are eliminated. This insures perfect closing of the gate plate and renders the valve trouble free. Should, by any chance, a viscous running medium be trapped between the closing valve edge 3 and the sealing member 9 a simple re-opening of the gate plate 2 will be sufficient to rinse away any material by the oncoming flowing medium.

Figure 3:
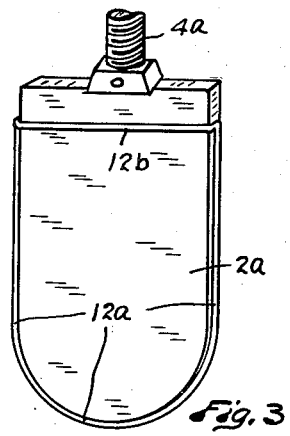
Fig. 3 is a detached front view of a gate plate showing elastic sealing means of modified form applied thereto.

Fig. 3 illustrates a modified form of this invention to be used in valves which are normally closed and only temporarily opened and in which there is ordinarily no pressure, or only temporary pressure, on the outlet side of the valve. The gate plate 2a and spindle 4a shown in Fig. 3 are the same as the parts 2 and 4 shown in Figs. 1 and 2. The sealing means shown in Fig. 3 is of one piece construction and is shown as it might appear if detached from the valve housing and applied to the gate plate 2a in the position in which it would be when the gate plate is closed. This sealing means comprises a part 12a similar to the previously described part 9 and a part 12b integral with the part 12a and which extends only half way around the gate plate 2a and is positioned on the inlet or pressure side of said gate plate 2a. The housing for the valve shown in Fig. 3 is of the same design as the housing or body 1 shown in Figs. 1 and 2 except that the transverse groove 10 in one of the body plates may be omitted.

Figure 4:
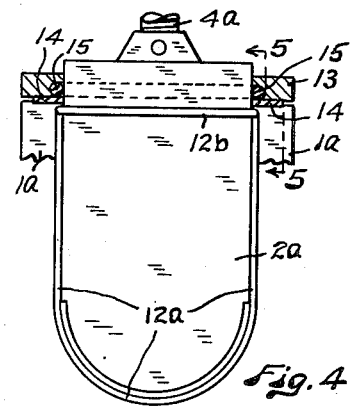
Fig. 4 is a view partly in elevation and partly in vertical section showing the gate plate and sealing means of Fig. 3 together with additional sealing rings between the upper portion of the gate plate and the valve body.
Figure 5:
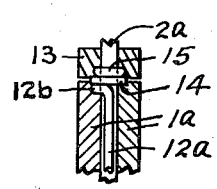
Fig. 5 is a sectional view, with parts in elevation, looking in the direction of broken line 5—5 of Fig. 4.

The gate plate 2a, shank 4a and sealing parts 12a and 12b shown in Figs. 4 and 5 are the same as those shown in Fig. 3. The body plates 1a shown in Figs. 4 and 5 are of modified form and terminate just above the sealing member 12b and are sealed relative to an upper body part 13 by a flat sealing ring 14 disposed between the body plates 1a and part 13. Another sealing ring 15 is disposed within a suitable groove in the body part 13. The sealing rings 14 and 15 both extend around the gate plate 2a above the sealing part 12b and seal against leakage around the gate plate and do away with the need for a packing gland around the valve stem 4a.

Figure 6:
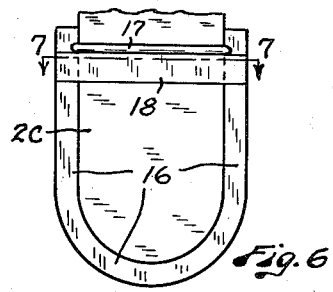
Fig. 6 is a detached fragmentary elevation of a gate plate with another modified form of elastic sealing means applied thereto.
Figure 7:
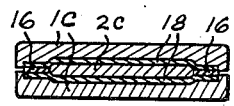
Fig. 7 is a sectional view taken on broken line 7—7 of Fig. 6 and further showing the parts in a valve housing.

In the form of invention illustrated in Figs. 6 and 7 the gate plate 2c is similar to the gate plates 2 and 2a shown in the preceding figures. A sealing member is shown in connection with a valve body in Fig. 7 and in Fig. 6 is shown as detached from the valve housing and applied to the gate plate 2c. This sealing member comprises a U shaped part 16 extending around the margin of the gate plate 2c, a sealing ring 17 extending transversely around the gate plate 2c near the upper end thereof and two tape like parts extending across the respective faces of the gate plate 2c below the ring 17, the tape like parts being numbered 18. The sealing parts 16 and 18 are flat in cross section and the part 16 is secured between and forms a seal between two body parts 1c. The inner edges of the sealing part 16 are substantially even or flush with the flow passageway through the valve. The sealing parts 16 and 17 completely enclose and seal off the flow passageway through the valve body or members 1c. The parts 18 help to support and tie together the sealing parts 16 and 17.

Figure 8:
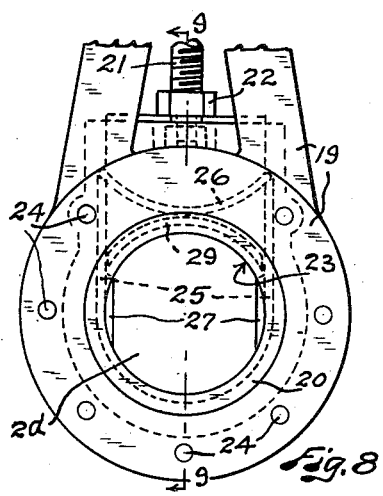
Fig. 8 is a fragmentary view in elevation of another modified form of the invention.
Figure 9:
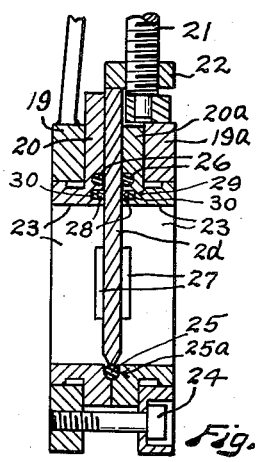
Fig. 9 is a vertical sectional view taken substantially on broken line 9—9 of Fig. 8.

The gate valve shown in Figs. 8 and 9 has an outside part comprising two outer body members 19 and 19a and an inside part comprising two inner body members 20 and 20a. A gate plate 2d is guided for movement between the inner body members 20 and 20a. A threaded valve stem or spindle 21 is positioned non-symmetrically of and extending to one side of the gate plate 2d. The spindle 21 is restrained against longitudinal movement and is threaded through a nut 22 which is welded to the upper end portion of the gate plate 2d and extends sidewise therefrom. Suitable openings 23 in the body members 20 and 20a provide a flow passageway through the valve housing in a direction at right angles to the gate plate 2d. The outer body members 19 and 19a fit over the inner body members 20 and 20a and all of the body parts are secured together by screws 24. The elastic sealing means shown in Figs. 8 and 9 is similar to the sealing means shown in Figs. 1 and 2 and comprises a U shaped sealing part 25 received within a groove 25a in the two inner body members 20 and 20a and extending around the margin of the gate plate 2d and a sealing ring 26 received in a suitable groove in the inner housing members 20 and 20a and extending around the upper portion of the gate plate 2d. The sealing ring 26 may extend straight across the gate plate 2d, like the sealing ring 11 of Figs. 1 and 2, or it may be curved toward the flow passageways 23 to thereby reduce the area of flat surface of the gate plate 2d which is subject to pressure of the flowing medium.

For gate valves designed to operate under high pressure better and longer guiding means for the edge portions of the gate plate 2d is provided if the housing members 20 and 20a have inwardly extending guide flanges 27 between which the gate plate 2d slides. The guide flanges 27 are narrow and do not materially obstruct the flow passageway through the valve. The part of the sealing member 25 which is contacted by the lower rounded edge of the gate plate 2d is substantially flush with the wall of the flow passageway through the valve, thus avoiding formation of pockets in which flowing medium can lodge.

To minimize the possibility of obstruction between the gate plate 2d and the inner surfaces of the body members 20 and 20a of valves to be used for controlling viscous or paste like material two scrapers 28 are preferably provided. These scrapers 28 extend across the gate plate 2d and conform to the curvature of the flow passageways 23 and are supported in grooves 29 in the housing members 20 and 20a and are pressed against the gate plate 2d by elastic backing members 30. These scrapers clean the surfaces of the valve plate each time it is moved.

An advantage of the four piece housing shown in Figs. 8 and 9 is that it makes possible the use of different materials for the housing parts which contact the flowing medium and the parts depended on for strength. Thus where non-corrosive inside valve members of expensive material are required the outside valve members can be of corrosive but strong and inexpensive material.

In all types of valves herein disclosed the seal members are quickly and easily replaceable and the U shaped sealing parts are flush with the walls of the flow passageways and there are no dead pockets in the flow passageways to catch material and increase flow resistance and there can not be any wedging of the valve plate into tapered seats with the possibility of binding and harder opening. Also in all instances the elastic seals cushion the valve plate in closing so that any desired valve closing means may be used. The elastic seals render this valve well suited for use with gases, steam and the like. The valve housings can be made of one piece constructions with grooves therein suitable to receive the elastic seal members.

Obviously changes in the construction of this valve may be made within the scope and spirit of the following claims.

I claim:

1. A gate valve comprising a valve body having a flow passageway extending therethrough and having a gate plate receiving recess positioned substantially at right angles to said flow passageway, said valve body further having a U shaped groove extending around the margin of said gate plate receiving recess and a second groove extending across at least one inner face of the gate plate receiving recess outwardly from the flow passageway and merging with said U shaped groove; a gate plate guided for movement in the gate plate receiving recess of the valve body; a U shaped elastic sealing member of substantially round cross section disposed in said U shaped groove substantially flush with the walls of the flow passageway and in sealing contact with the edge portions of the gate plate when the gate plate is in closed position; and a second elastic sealing member integral with said U shaped sealing member and positioned in the second groove and extending across said gate plate outside of the flow passageway in continuous sealing contact with at least one face of the gate plate, said two sealing members providing a one piece closed seal extending entirely around the flow passageway of the valve.

2. A gate plate as claimed in claim 1 in which the inside faces of both walls which cooperate in forming the gate plate receiving recess in the valve body are provided with a continuous groove extending entirely around the gate plate in a plane at right angles to the U shaped marginal groove and in which the two sealing members are integral and form two closed loops at right angles to each other with the second sealing loop disposed in the continuous groove and extending entirely around the gate plate.

3. A gate valve comprising a valve body having a flow passageway extending therethrough and having a gate plate receiving recess positioned substantially at right angles to said flow passageway, said flow passageway being substantially straight and unobstructed and of substantially the same area from one side to the other of said valve, said valve body further having a U shaped groove extending around the margin of said gate plate receiving recess and having a second groove extending across at least one inner face of the gate plate receiving recess outwardly from the flow passageway and merging with said U shaped groove, both of said grooves being of narrow width; a flat gate plate guided for opening and closing movement in the gate plate receiving recess of the valve body; a U shaped elastic sealing member of substantially round cross section disposed in said U shaped groove, the depth of the U shaped groove being substantially equal to the diameter of the sealing member and the sealing member being substantially flush with the walls of the flow passageway and in sealing contact with the edge portions of the gate plate when the gate plate is in closed position, the gate plate having a tip of substantially less width than the diameter of the U shaped sealing member positioned to contact said U shaped sealing member providing sealing contact with minimum pressure of the gate plate against the sealing member; and a second elastic sealing member disposed in said second groove and extending across the gate plate outside of the flow passageway in continuous sealing contact with at least one face of said gate plate, said two sealing members making contact with each other at the location where the two grooves intersect and providing a closed seal extending around the flow passageway of the valve.

4. A gate valve comprising a valve body having a flow passageway extending therethrough and having a gate plate receiving recess positioned substantially at right angles to said flow passageway, said flow passageway being substantially straight and unobstructed and of substantially the same area from one side to the other of said valve body, said valve body further having a U shaped groove extending around the margin of said gate plate receiving recess and above the flow passageway and having a second groove extending across at least one inner face of the gate plate receiving recess outwardly from the flow passageway, the end portions of said second groove merging with said U shaped groove and said second groove being curved toward the flow passageway, whereby the area of the gate plate surface against which fluid pressure is exerted is minimized, both of said grooves being of narrow width; a flat gate plate guided for opening and closing movement in the gate plate receiving recess of the valve body; a U shaped elastic sealing member of substantially round cross section disposed in said U shaped groove, the depth of the U shaped groove being substantially equal to the diameter of the sealing member and the sealing member being substantially flush with the walls of the flow passageway and in sealing contact with the edge portions of the gate plate when the gate plate is in closed position, the gate plate having a tip of substantially less width than the diameter of the U shaped sealing member positioned to contact said U shaped sealing member providing sealing contact with minimum pressure of the gate plate against the sealing member; and a second elastic sealing member disposed in said second groove and extending across the gate plate outside of the flow passageway in continuous sealing contact with at least one face of said gate plate, said two sealing members making contact with each other at the locations where the two grooves intersect and providing a closed seal extending entirely around the flow passageway of the valve.

5. A gate valve comprising a valve body having a flow passageway extending therethrough and having a gate plate receiving recess positioned substantially at right angles to said flow passageway, said flow passageway being substantially straight and unobstructed and of substantially the same area from one face to the other of the valve body, the valve body further having a U shaped groove extending around the margin of said gate plate receiving recess and a second groove extending across at least one inner face of the gate plate receiving recess outwardly from the flow passageway and merging with said U shaped groove, both of said grooves being of narrow width and the valve body further having a curved scraper receiving groove extending across the inner face of the gate plate receiving recess and partially around the flow passageway between said second groove and the flow passageway; a flat gate plate guided for opening and closing movement in the gate plate receiving recess of the valve body; a scraper member in said scraper receiving groove; spring means yieldingly urging said scraper member against the face of the gate plate; a U shaped elastic sealing member of substantially round cross section disposed in said U shaped groove, the depth of the U shaped groove being substantially equal to the diameter of the sealing member and the sealing member being substantially flush with the walls of the flow passageway and in sealing contact with the edge portions of the gate plate when the gate plate is in closed position, the gate plate having a tip of substantially less width than the diameter of the U shaped sealing member positioned to contact said U shaped sealing member and providing sealing contact with minimum pressure of the gate plate against the sealing member; and a second elastic sealing member disposed in said second groove and extending across the gate plate outside of the flow passageway in continuous sealing contact with at least one face of said gate plate, said two sealing members making contact with each other at the locations where the two grooves intersect and providing a closed seal extending entirely around the flow passageway of the valve.

6. A gate valve comprising two separable complementary inner body members positioned face to face and having registering openings providing a flow passageway extending therethrough and providing a gate plate receiving recess positioned substantially at right angles to said flow passageway, said flow passageway being substantially straight and unobstructed and of substantially the same area from one side to the other of said valve, the adjacent faces of the two inner valve body members being recessed to provide therebetween a U shaped groove extending around the margin of said gate plate receiving recess and a second groove extending across at least one inner face of the gate plate receiving recess outwardly from the flow passageway and merging with said U shaped groove, both of said grooves being of narrow width; two separable outer body members fitting against the outer sides of the inner body members; bolts connecting the two outer body members securely clamping all of said body members together in forming a liquid tight valve body in which the inner body members are characterized by their capacity to resist destructive action of fluids within the valve and the outer body members are characterized by their strength and capacity to reinforce and support the inner body members and constitute the strength elements of the valve body; a flat gate plate guided for opening and closing movement in the gate plate receiving recess of the valve body; a U shaped elastic sealing member disposed in said U shaped groove, the sealing member being substantially flush with the walls of the flow passageway and in sealing contact with the edge portions of the gate plate when the gate plate is in closed position, the gate plate having a tip of substantially less width than the sealing member positioned to contact the U shaped sealing member and providing sealing contact with a minimum pressure of the gate plate against the sealing member; and a second elastic sealing member disposed in said second groove and extending across the gate plate outside of the flow passageway in continuous sealing contact with at least one face of said gate plate, said two sealing members making contact with each other at the location where the two grooves intersect and providing a closed seal extending entirely around the flow passageway of the valve.

7. A gate valve comprising a valve body having a flow passageway extending therethrough and having a gate plate receiving recess positioned substantially at right angles to said flow passageway, said valve body further having a U shaped groove extending around the margin of said gate plate receiving recess and a second groove extending across at least one inner face of the gate plate receiving recess outwardly from the flow passageway and merging with said U shaped groove, both of said grooves being of narrow width; a flat gate plate guided for opening and closing movement in said gate plate receiving recess; a U shaped elastic sealing member of substantially round cross section disposed in said U shaped groove; the depth of the U shaped groove being substantially equal to the diameter of the sealing member and the sealing member being substantially flush with the walls of the flow passageway and in sealing contact with the edge portions of the gate plate when the gate plate is in closed position, the gate plate having a rounded inner end portion of substantially less width than the diameter of the U shaped sealing member positioned to contact the U shaped sealing member providing sealing contact with minimum pressure of the gate plate against the sealing member; a second elastic sealing member disposed in said second groove and extending across the gate plate outside of the flow passageway in continuous sealing contact with at least one face of said gate plate, said two sealing members making contact with each other at the location where the two grooves intersect and providing a closed seal extending entirely around the flow passageway of the valve; and two pairs of spaced apart gate plate guide lugs rigid with the valve body and positioned at the respective sides of the flow passageway and extending a short distance into the flow passageway at the sides of the gate plate, each pair of guide lugs slidably receiving therebetween an edge portion of the gate plate in supporting and guiding said gate plate without substantially obstructing said flow passageway.

References Cited in the file of this patent

UNITED STATES PATENTS

| | | |
|---|---|---|
| 1,801,237 | Hanson | Apr. 14, 1931 |
| 2,064,567 | Riley | Dec. 15, 1936 |
| 2,298,212 | Huston | Oct. 6, 1942 |
| 2,329,315 | Allen | Sept. 14, 1943 |
| 2,401,123 | Volpin | May 28, 1946 |
| 2,410,404 | Buchanan | Nov. 5, 1946 |
| 2,420,849 | Wilson | May 20, 1947 |
| 2,600,497 | Hamer | June 17, 1952 |
| 2,669,416 | Hilton | Feb. 16, 1954 |